Sept. 26, 1967 G. C. DEWEY ET AL 3,344,428
GUIDANCE SYSTEM FOR COUNTER INSURGENCY OPERATIONS
Original Filed Dec. 30, 1963 5 Sheets-Sheet 1

INVENTORS
GORDON C. DEWEY
LOUIS H. BENZING
BY
*Nolte and Nolte*
ATTORNEYS

INVENTORS
GORDON C. DEWEY
LOUIS H. BENZING
BY
*Nolte and Nolte*
ATTORNEYS

INVENTORS
GORDON C. DEWEY
LOUIS H. BENZING

BY

Nolte and Nolte

ATTORNEYS

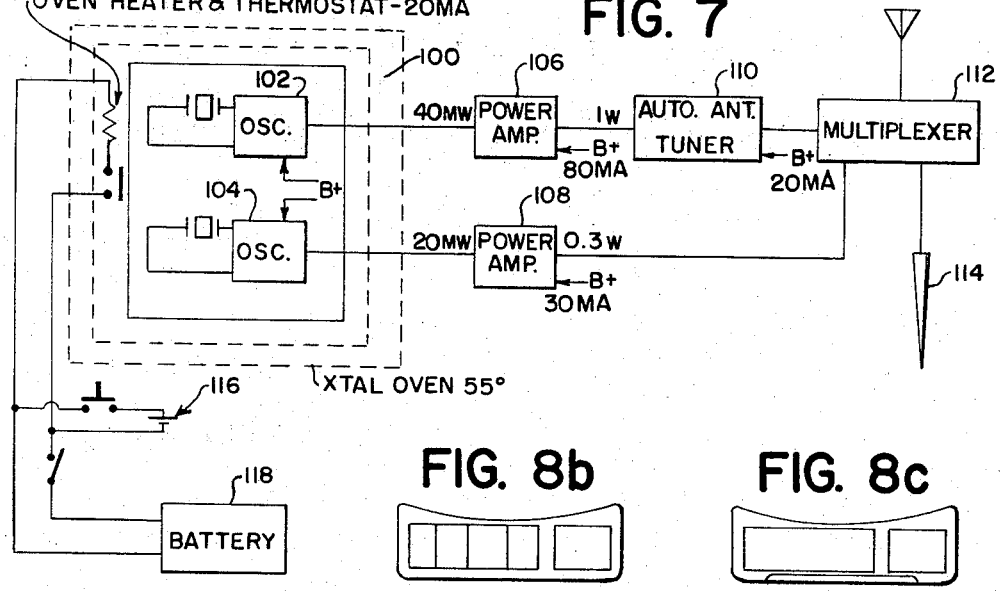
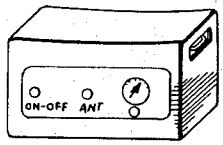
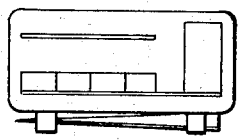
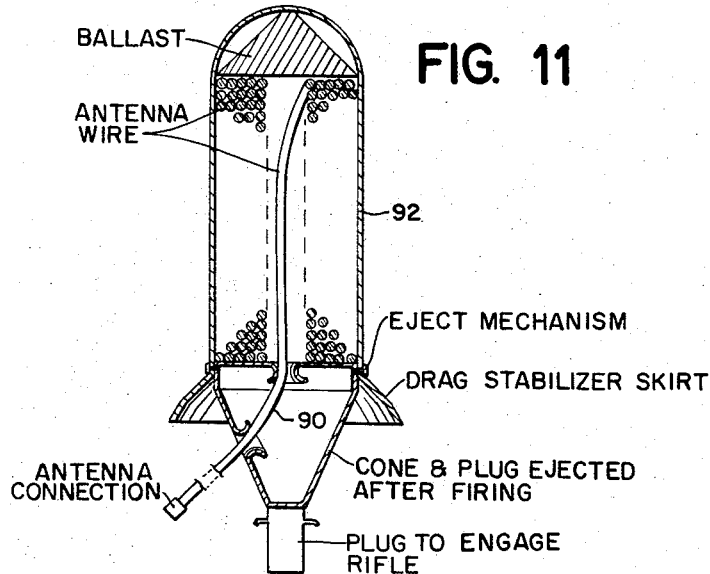

INVENTORS
GORDON C. DEWEY
LOUIS H. BENZING
BY
*Nolte and Nolte*
ATTORNEYS

United States Patent Office

3,344,428
Patented Sept. 26, 1967

3,344,428
GUIDANCE SYSTEM FOR COUNTER
INSURGENCY OPERATIONS
Gordon C. Dewey, New York, N.Y., and Louis H. Benzing, Leonia, N.J., assignors to The G. C. Dewey Corporation, New York, N.Y., a corporation of New York
Continuation of application Ser. No. 334,500, Dec. 30, 1963. This application June 10, 1966, Ser. No. 564,461
18 Claims. (Cl. 343—112)

ABSTRACT OF THE DISCLOSURE

An aircraft moving at a determined altitude and velocity relative to a ground based beacon transmitter carries apparatus for counter-insurgency operations. The apparatus comprises first and second antennae. A hybrid circuit has two inputs each coupled to the output of a corresponding one of the antennae and producing at each of its outputs the sum and difference of signals received by the antennae. An indicator coupled to the output of the hybrid circuit produces an indication proportional to the magnitude of the difference of the signals at the output of the hybrid circuit. A reference frequency source provides a fixed reference frequency determined by the altitude and velocity of the aircraft. A Doppler circuit coupled to the output of the hybrid circuit produces signals indicative of the Doppler shift in signals from the beacon transmitter received at the aircraft with respect to the reference frequency. A warning indicator responsive to predetermined Doppler frequencies indicates specific distances between the beacon transmitter and the aircraft including when the aircraft is substantially directly above the beacon transmitter.

---

This invention relates to counter-insurgency operations functioning with low speed, low altitude aircraft.

This application is a continuation of the copending application, Ser. No. 334,500, filed Dec. 30, 1963, now abandoned.

In general, such systems must permit air drops of material, supplies, personnel, etc. with adequate accuracy so that the personnel and/or material can be quickly located by small parties of friendly personnel on the ground, a very difficult problem in dense jungle. It is obvious that no sophisticated electronic system can be used on the ground or in the aircraft.

Basically, the system must provide rough locations of the drop zone from a distance of 100 miles and must also provide accurate drop signals to get CEP's (cross-track error probabilities) as small as possible, preferably less than a few hundred feed. It must also be possible for the aircraft to operate the entire mission at an altitude of 500 feet, day or night. Equally important, the ground equipment must be simple, rugged and capable of emplacement by indigenous personnel; i.e. a single man carried box (marker beacon) not requiring operating adjustments.

The basic parameters discussed and the equipment outlined for the aircraft and ground beacon are almost directly applicable to use not only for drop zone operations but for target marking. The aircraft equipment probably would need no alterations; the ground beacon could be simplified with much more reasonable power sources to meet the expendible requirement. The object of the invention is to provide an air drop system including the features set forth above.

The invention provides rough position location by means of a direction finder device (ARN-6) on a low frequency (LF) signal (300 kc.) of about one watt power from a drop marker beacon. This signal may be radiated from a simple wire antenna placed into the jungle treetops. In order to obtain workable ranges, a crystal controlled signal is radiated from the drop marker beacon and a small 'black box" added to the direction finder to provide radio frequency (RF) amplification with extremely narrow crystal controlled RF bandwidth in the loop and sense antenna channels of one band of the direction finder.

The invention also provides accurate drop signals by means of 30 mc. high frequency (HF) low power signals (0.3 watt) radiated by the same drop marker beacon through use of the same antenna (coax portion) mentioned above. The 30 mc./s. signal is received by a simple homer receiver in the aircraft (e.g. two each HF blade or loop type antennas on either side of the aircraft nose and a phase comparison heading indicator). The 30 mc./s. signal radiated from the ground should be accurately crystal controlled, and the aircraft equipment contains a similar narrow band crystal controlled receiver. The received signal is heterodyned against the aircraft signal, resulting in a Doppler beat as a result of the aircraft ground speed. The drop signals are generated from the zero Doppler beat as the aircraft passes over the drop marker antenna. The invention is usable for low speed, low altitude drops of the kind involved here, where allowance for forward travel of the material during the drop need not be large.

Use of the invention is possible in a counter-insurgency environment where the 300 kc. and 30 mc. radio frequencies needed can be used as might not be the case in a highly complex radio frequency environment. Furthermore, the use of HF Doppler beat for generating drop signals provides the most elementary possible ground equipment, which is of over-riding importance.

The invention provides for modification of the direction finder for a counter-insurgency drop operation for direction finding out to a range of 100 miles. The aircraft is able to locate and identify specific coded beacons using the radio direction finder, modified with an added amplifier to receive the beacon's LF signals. In addition to the direction finder modification, a small HF homer receiver allows the aircraft to home on an HF marker beacon at ranges of about 15–20 miles. Precise bearing information is obtained by use of a simple homer operating on the HF signal from the beacon. The aircraft will home on the HF beacon until warning and drop signals are received. The drop signal is developed on the HF link by measuring Doppler shift of the beacon's HF signal with the aircraft HF signal and the Doppler due to aircraft ground speed. Assuming good pilot tracking of indicator needle and expected system errors, exclusive of errors due to ballistic or parachute fall, an average CEP of 100 feet can be achieved.

The system configuration is relatively simple using straightforward design and all solid state components. Operating system is extremely simple and requires a minor amount of aircraft modification. The aircraft parameters considered are those used for counter-insurgency operations not high performance aircraft, i.e., speeds as low as 120 kts. and low altitudes in the neighborhood of 500 feet.

For simplicity in explanation of the proposed guidance system specific values have been selected for the LF frequency (300 kc.) and for the HF frequency (30 mc.). Actually the LF can be anywhere between 100–500 kc. and the HF anywhere between 20–80 mc. The selection of the exact LF and HF frequencies is more a function of the ground drop zone marker beacon requirements than the aircraft guidance system requirements.

In order that the present invention may be readily carried into effect, it will now be described with reference to the accompanying drawings, wherein:

FIG. 7 is a block diagram of the drop beacon circuits;

FIGS. 8a, 8b, 8c, 8d and 9 are different embodiments of the beacon configuration;

FIG. 11 is an illustration of the antenna wire wound within its canister.

Figure 1:
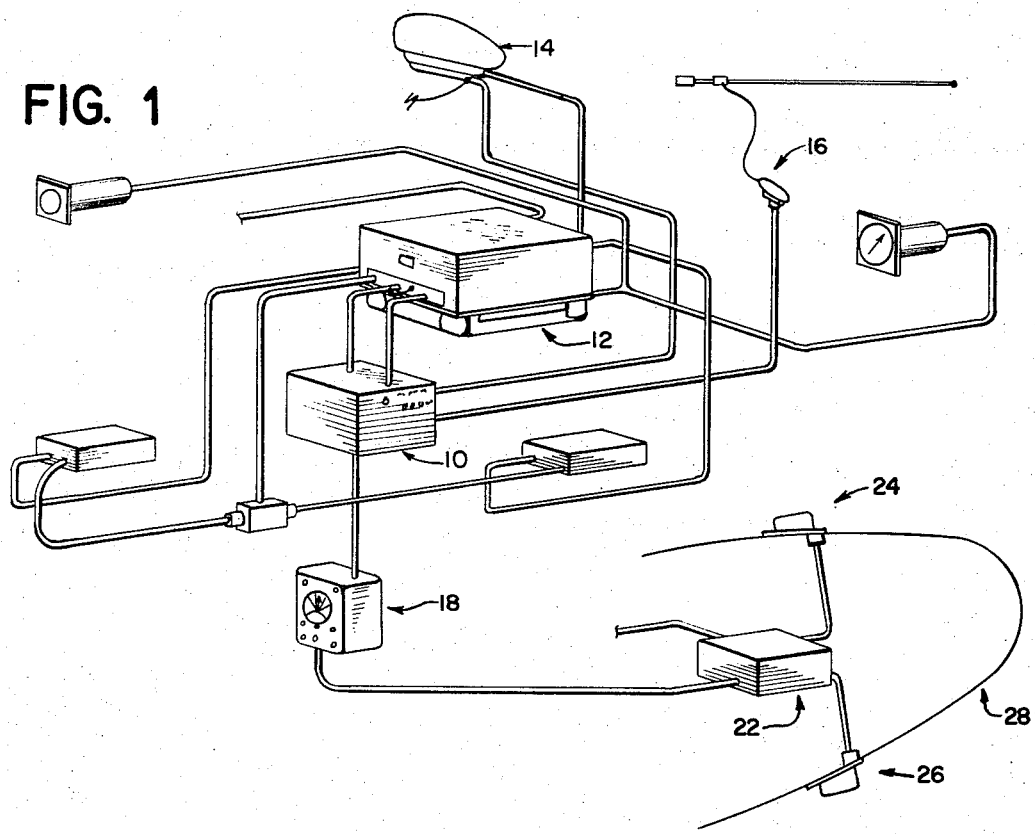
FIG. 1 is a block diagram of the airborne equipment of the invention.

The hardware elements of a preferred embodiment of the invention are shown in FIG. 1. The airborne components include a narrow band amplifier 10 which is cabled into the direction finder installation by insertion between the radio compass unit 12, loop unit 14 and antenna coupling unit 16 with a positive switch action to permit normal direction finder operation. The LF amplifier unit 10 provides a means of inserting 40 db of very narrow-band, low noise amplification at the LF (300 kc.) frequency, along with the five different coded LF receiver frequencies for security and basic identification. The five frequencies are 300 kc.±100 c.p.c.±200 c.p.s. The aircraft also includes an indicator unit 18 for the pilot, to operate with the 30 mc. homer/receiver. Indicator unit 18 has a modified ILS type fly right-fly left indicator with lights to signal the instants of warning, ready, and drop, and identification code selectors for both the LF and HF channels. A small HF special homer/receiver 22 with crystal-controlled Doppler detecting circuits and two HF blade (or loop) antennas 24 and 26 are installed on either side of the aircraft nose indicated schematically at 28.

The equipment located on the ground includes a drop marker beacon (300 kc./s. and 30 mc./s. transmitters) (FIGS. 7–9), self-contained batteries and crystal module inserts for frequency identification codes; a rifle grenade launching antenna system (FIG. 10); and a balloon launched antenna kit.

AIRBORNE EQUIPMENT

Figure 2:
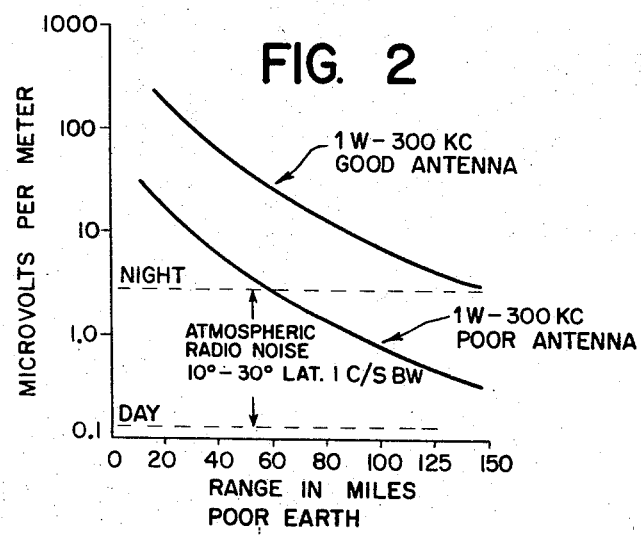
FIG. 2 is a graph of received signals versus range for different antennas at night and during the day.

*Long range homing.*—The requirements for low power, usable signals at low altitudes, and ranges of 100 miles requires the use of ground wave signals. As a practical matter, the choice of a suitable frequency is a compromise between the inefficiency of the ground antenna (lower frequencies are less efficient) and atmospheric radio noise (higher frequencies give relatively more noise). Usable frequencies lie between 100 kc. and 500 kc. A frequency of 300 kc. may be considered a reasonable compromise (see FIG. 2).

A system with a ground transmitter which is ultra-portable and capable of approximately 35 hours self-contained battery operation is limited to about 1 w. transmitted power (consider also the HF transmitter). Antenna radiation efficiencies of a few percent are characteristic of a treetop, thin-wire antenna in the jungle environment, i.e., 20 db loss has been assumed for the LF antenna of the drop marker beacon.

Under these conditions, an ordinary LF aircraft radio receiver of 3 to 10 kc. bandwidth would have an inadequate signal-to-noise ratio. The invention uses a crystal-controlled transmitter on the ground 300 kc.±0.03 c./s. which is readily obtainable. In the aircraft, a small transistorized, low noise amplifier is inserted between the loop and sense antennas, and the standard direction finder receiver. The essence of this amplifier is the use of a crystal filter of approximately 1 c./s. bandwidth and a gain of about 40 db. Both of these characteristics are readily obtainable including the necessary stability of the center frequency of the crystal filter (±0.1 c./s.). This restriction of the receiver bandwidth will reduce the received atmospheric noise sufficiently to permit long range (100 miles) direction finding with the direction finder.

*HF (short range) homing.*—The nominal receiver power of the HF homer is given by the usual free space (line-of-sight) relation, which yields a value of −67 dbm, although the actual received power will be much less due to transmitting antenna loss and propagation margin.

The 30 mc. ground transmitting antenna will be inefficient and a loss of 30 db may be assumed. A fading margin of 30 db is also estimated to be required. The actual received power is, therefore, the nominal receiver power (−67 dbm) minus 60 db or −127 dbm. The 30 mc. HF receiver, like the LF receiver, is provided with a narrowband crystal filter of approximately 100 c./s. bandwidth. The receiver noise can, therefore, be shown to equal −138 dbm, giving a conservative signal-to-noise ratio of 11 db at 15 miles. At ranges of 5 miles, where the actual drop will be set up, the 30 db propagation loss is more than ample and signal-to-noise ratios of the order of 40 db are obtained.

Figure 3:
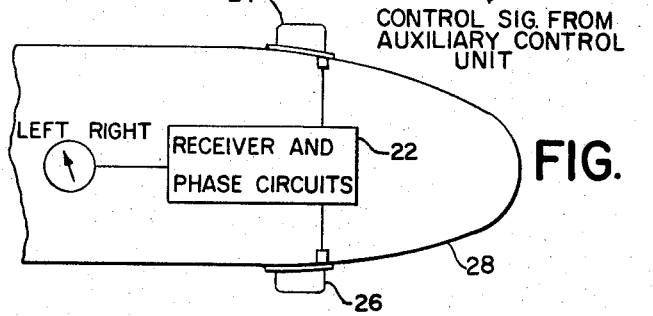
FIG. 3 is a schematic diagram showing antenna placement in the nose of the aircraft.

FIG. 3 shows the concept of the homing system. The relative phase, $\phi_a$, between the two HF antenna signals (neglecting aircraft and receiver perturbations for the moment) can be shown to equal 1.2 sin $\phi$ radians. If the accuracy of heading indication is to be 1° or better, the angle $\phi_a$ must be large compared to the effective receiver noise perturbation (taken twice, once for each receiver) as smoothed by the phase detection circuits. The close-in signal-to-noise ratio of 40 db will cause about .01 radian random phase shift in each antenna's signal (i.e., a voltage ratio of .01) so that a 1° error in heading will give an indication $\phi_a = .02$ radian (1.2×.017)

$\phi_N = \sqrt{2} \times .01$ radian
 $= .014$ radian $\Big\}$ at 100 c./s. bandwidths where $\phi_N$ is the equivalent aircraft heading error due to receiver noise. $\phi_N$ is further reduced by the bandwidth of 2 c./s. output filter (actually the speed of response of a properly damped D'Arsonval zero center meter) so that the left-right heading indicator will give reliable, stable indication of 1° heading errors, with an adequate speed of response, so that the terminal cross-track drop errors will be determined by the pilot's maneuvering actions in compensating for short term heading errors, cross-winds, gust, etc. It is possible that direct interconnection to an auto-pilot would be desirable after the initial manual system has been tried out (assuming some of the aircrafts used in the counter-insurgency operations have an auto-pilot).

*HF Doppler drop signal generations.*—As discussed above the HF homer receiver will permit the pilot to home on the drop marker beacon with a high degree of accuracy; the instant for airborne drop is determined by detecting the Doppler zero beat, i.e., the point in space where the frequency of an accurate crystal controlled 30 mc. oscillator in the aircraft and the precise frequency signal received from the ground cancel out with Doppler frequency caused by aircraft movement. At this instant the aircraft will be at a minimum range to the drop marker beacon.

The basis of this approach is illustrated in Table I (below) which shows the time to go as a function of Doppler frequency for a 120 kt. ground speed, for two different distances to target (drop marker beacon), where the distance is the minimum slant range, i.e., the square root of the sum of the squares of the altitude and crosstracks error. The electronic circuits in the Doppler drop indicator determine the Doppler frequency as soon as the HF signal strength is adequate, at least seven and a half minutes (15 miles) prior to drop. This Doppler frequency is determined by the aircraft's ground speed. The warning, ready and drop lights will then be turned on when the Doppler frequency falls respectively to 90%, 60% and approximately 15% of original Doppler frequency.

The detection of these small Doppler beat frequencies and particularly the use of the 15% point for the drop signal require accurate frequency alignment and excellent frequency stability. Standard commercial crystal oscillator-oven packages are available, giving stabilities of 1 part in $10^8$ or 0.3 c./s. long-term frequency stability. Short term stabilities of 1 part in $10^9$ are also readily available. Standard check-out and test equipment are now available giving stabilities of 1 part in $10^{10}$ or better.

TABLE I.—TIME TO GO (SECONDS)

[Doppler Frequency (30 mc./RF Carrier, 120 kt. Ground Speed)]

|  | Overhead Pass (500 ft. alt.), seconds | 750 ft. Cross-Track Error (500 ft. alt.), seconds |
|---|---|---|
| Doppler Frequency: | | |
| 6.666 c./s | 180 | 360 |
| 6.655 c./s | 60 | 120 |
| 6.613 c./s | 30 | 60 |
| 6.503 c./s | 15 | 30 |
| 6.33 c./s | 9 | 18 |
| Warning: | | |
| 5.95 | 6 | 12 |
| 4.71 | 3 | 6 |
| Ready: | | |
| 3.43 | 1.8 | 3.6 |
| 2.86 | 1.2 | 2.4 |
| Drop: | | |
| 1.36 | 0.6 | 1.2 |
| 0 | 0 | 0 |

*Estimate of CEP (cross-track error probability).*—Errors of 0.3 c./s. each in the ground and airborne equipment will give 0.6 c./s. total error in the beat note (if added), which could result in drop time errors of ±1.0 seconds. At 120 kt. ground speed, this will result in along track errors of ±200 ft. as the very maximum. These drop errors from the crystal frequency errors will be comparable to or smaller than the other errors.

The CEP of this design concept is estimated to be composed of (a) cross track error caused by a 2° heading error at 30 seconds to go, i.e., 200 ft. approximately (max.—not RMS); and (b) along track error of 200 ft. due to crystal frequency errors (max.—not RMS). These errors result in an estimated CEP of 200 ft. (max.—not RMS) for the actual drop point of the material.

Figure 4:
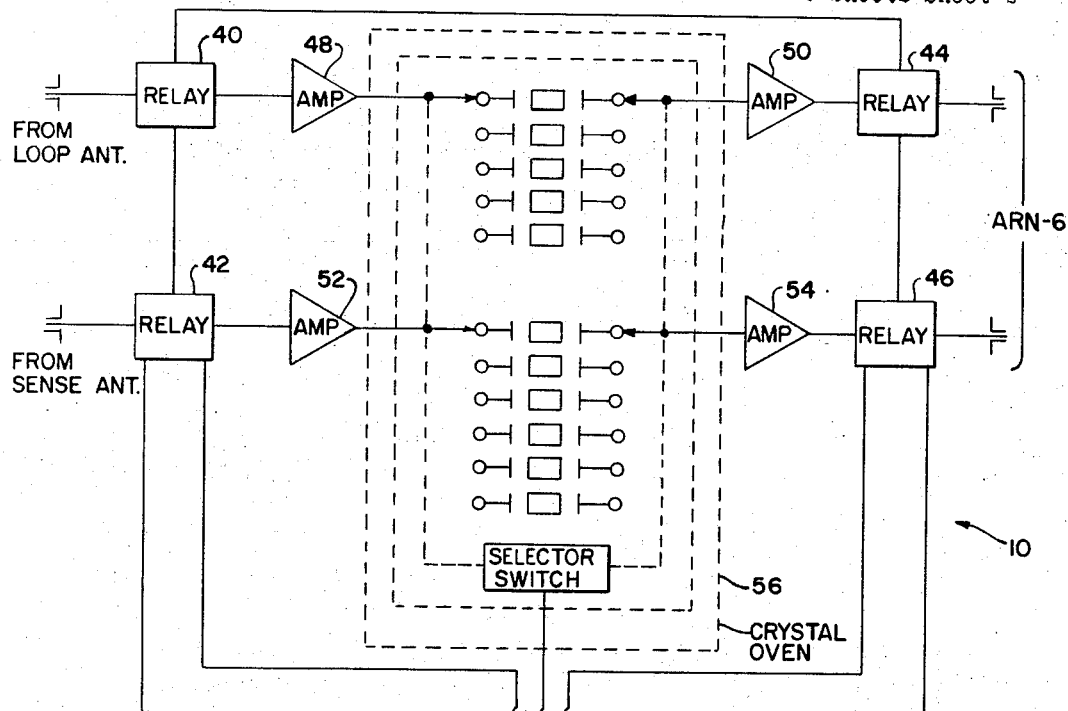
FIG. 4 is a block diagram of the direction finding system.

*LF amplifier 10.*—FIG. 4 shows a block diagram of LF amplifier 10. The unit will contain relays 40 and 42, 44 and 46 so that two paths exist through the unit: (1) a direct through path when the relays are not energized; and (2) a path through two parallel sets of amplifiers 48, 50 and 52, 54 and crystal filters 56.

The amplifier-crystal filter path provides 40 db gain and crystal controlled filter bandwidth of approximately 1 c./s. The filter crystals will be maintained in temperature stabilized oven (standard MIL) equipment. These solid state amplifier circuits will be designed to provide a high degree of isolation between the crystal filter and the antenna and receiver connections. The input amplifiers will have noise figures of 11 db or better.

All circuits can be transistorized and carefully designed for reliable long life operation. All units can operate from the standard aircraft 24 v. DC supply and can be designed with conventional, state-of-the-art transistor techniques.

Figure 5:
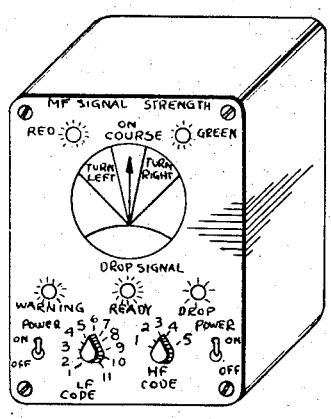
FIG. 5 is an illustration of the pilot's control box.

*Pilots auxiliary control and indicator unit 18.*—This unit is shown in FIG. 5. The unit will present to the pilot the signal lights for HF signal strength, the warning, ready and drop signal lights, the left-right indicator. This unit will also contain the ON-OFF switches for the LF (interconnection to the direction finder) and HF units and the LF and HF code selector switches. It will be connected by one cable each to the LF and HF units. The cable to/from the HF unit will contain the 24 v. DC aircraft supply voltage and will feed the supply voltage to the LF unit (direction finder attachment). Therefore no special supply voltage cabling will be necessary except directly to the HF unit as shown in FIG. 1.

*Receiver-homer 22.*—This unit is connected to the left and right antennas 24 and 26 on the aircraft nose. The HF signals from these antennas are processed in the unit to yield right-left homing indications and drop signals. The location of the HF antennas near the nose of the aircraft is not critical nor the type selected except that they should be approximately 6 feet apart. A location near the nose should be closer where the two antennas can be placed giving free air reception ahead and slightly downward and the placement on either side of the nose should be such as to be identical within the limits of the aircraft structure. Blade type antennas should preferably be flush mounted types, but this selection would be based upon availability of antennas and mounting considerations. The antennas radiate at 30 mc.

Figure 6:
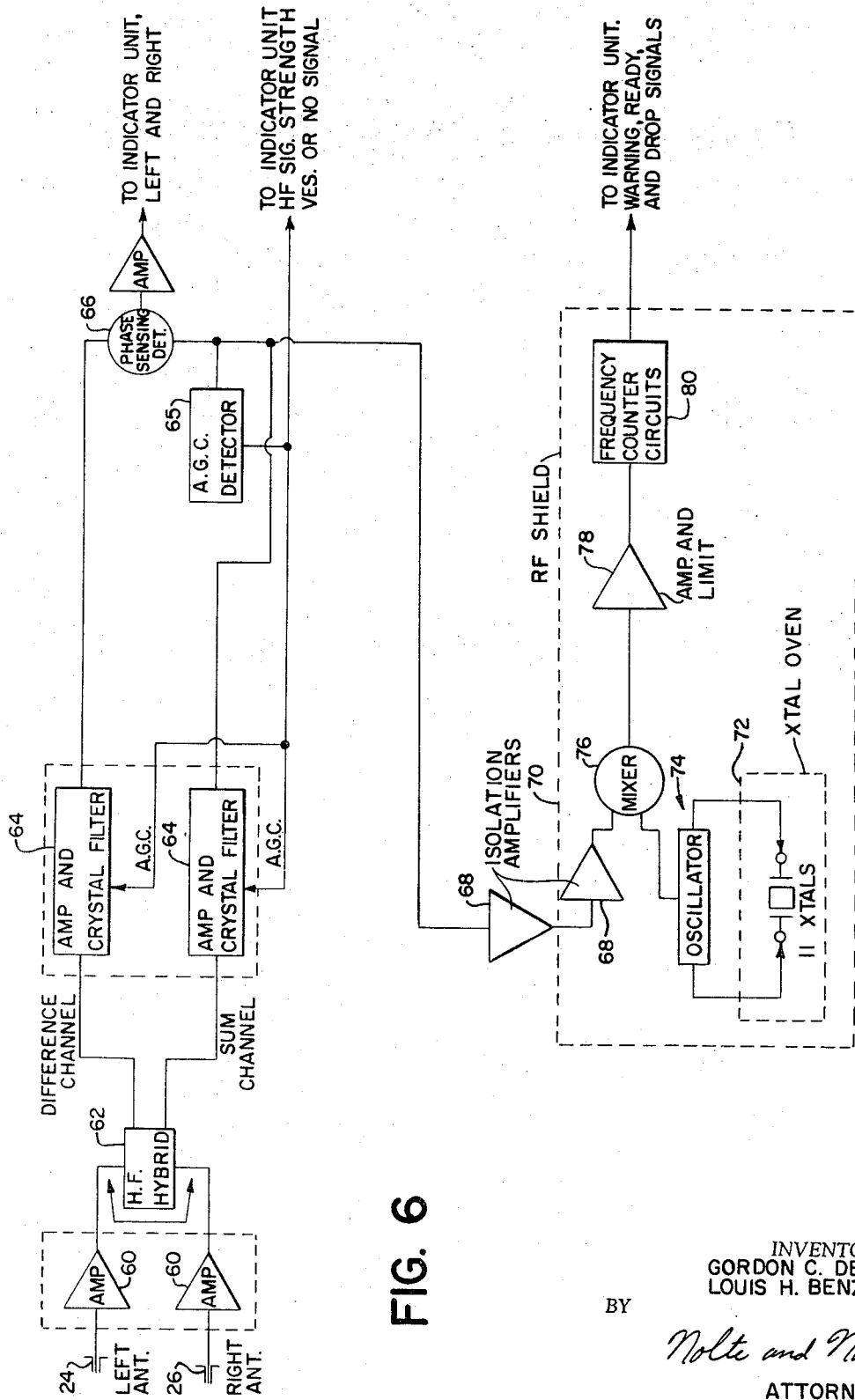
FIG. 6 is a block diagram of the receiver-homer unit.

FIG. 6 shows the block diagram of the unit. The antennas are connected to identical low noise, feedback stabilized transistor amplifiers 60 at 40 db gain. The output of each amplifier is connected to an HF hybrid 62 of standard design to yield sum and difference signals. Provision is made in the hybrid circuit to make an installation adjustment of phase and amplitude of the left and right channels to achieve difference signal null for zero heading error HF signal (made once upon installation).

The sum and difference channels are then again amplified by identical amplifiers 64, each with a narrow-band (±100 c.p.s.) crystal filter. The sum channel amplifier also provides a DC signal from AGC detector 65 on both sum and difference channels. The AGC voltage is also used to actuate the HF signal strength indicator (failure of the light on the control panel to show "Green" means the HF signal is not strong enough to give reliable direction information). The difference channel signal is passed through a phase detector 66 using the sum channel as a reference to give right-left indications. The sum channel's phase will not change as the heading angle goes through zero, but the difference channel undergoes a 180° phase reversal, giving the required ±DC output for the flight indicator.

A portion of the sum channel output is passed through an isolation amplifier 68 into a specially shielded RF enclosure box 70. A crystal oven 72 in the RF enclosure box 70 contains the 11 precision crystal oscillators 74 required for the Doppler beat detection to give the warning, ready and drop signal indications. This unit is so designed as to give a very high degree of isolation (120 db) between the locally generated HF signals and the rest of the unit, which is essential to prevent the received and locally generated signals from interfering with its operation. To prevent maintenance troubles and later reduced performance, this unit should be totally sealed and repairable only at the factory; no field repair would be allowed. The unit is not especially complicated or difficult to build and being all solid state is extremely reliable. The main purpose is to maintain the necessary RF shielding intact so the necessary 120 db isolation can be assured at all times.

The outputs of isolation amplifiers 68 and oscillators 74 are combined in mixer 76, amplified and limited in amplifier 78, and then fed to a frequency counter 80 which couples the warning signals to indicator 18 (FIG. 1). Amplifiers 60 and 64 require constancy of phase shift between identical pairs in order to preserve the accuracy of the heading indication. These amplifiers utilize large bandwidth transistors with at least 15 db per stage negative feedbacks. The amplifiers may be operated by a Zener diode, regulated power supply. Careful design is a necessity, but the worst possible problem could be resolved by adding a constant temperature oven around the amplifiers. This oven would be the same as that used for the crystals as shown in FIG. 4.

GROUND BASED EQUIPMENT

*Beacon.*—The beacon has the following characteristics—

Physical:
- (A) Weight .......... 16 pounds (max.)*.
- (B) Size .............. 5½″ high x 14″ width x 4.5″ thick.
- (C) Fully transistorized.
- (D) Controls ........ ON-OFF switch.
- (E) Antenna ......... Wire in tree tops.
- (F) Batteries ........ 8.4 pounds NI–CD (24 volts)*.
- (G) Operating time .... 35 hrs. minimum (dial to read power available)*.

Signals:
- LF (for long range rough location) .......... 1 w. CW at 300 kc. crystal controlled. 1 part in $10^7$ stability.
- HF (for close in warning and drop signal) ...... 0.3 w. CW at 30 mc. crystal controlled. 1 part in $10^8$ stability.

Identification code (55) to total codes—simple crystal module insert—no adjustment) .... Eleven different LF beacon frequencies 300 kc. ±100 LFS ±200 c./s. ±300 c./s. ±400 c./s. ±400 c./s. ±500 c./s. Five different HF frequencies 30 mc./s. ± kc./s. ±2 kc./s.

* The 8.4 lbs. of batteries is composed of four identical cells. If less than 35 hours of operation were required the unit weight could be reduced accordingly. For example, for 8 hours operation the unit weight would be 10 lbs.

The selection of the 300 kc. LF frequency and the 30 mc. HF frequency was made to meet the best compromise between the need for long range rough location and precise drop zone location. Changing frequency selection is relatively simple, as simple as code changing, i.e., insert a new crystal module. For the LF transmitter any frequency between 100 kc. and 500 kc. would be acceptable as a function of the compromises between low efficiency of the antenna at the lower frequencies and atmospheric radio noise at the higher frequencies; 300 kc. is a reasonable compromise under the circumstances. For the HF transmitter, any frequency between 20 mc. and 80 mc. would be acceptable with 30 mc. a compromise based upon best antenna efficiency for the requirement of using one treetop antenna covering both the LF and HF transmitters and non-interference with other transmitting devices on the ground or in an aircraft.

Because of its inherent simplicity of operation and reasonable cost, the same electronic unit could be used as a target marker. Depending upon desired range of operation the HF transmitter may serve the target marker application without need for the LF transmitter. Regardless of the number of transmitters required, the batteries would be disposable types designed for limited operations, therefore, considerably less expensive than the drop zone marker. A very simple recharger could be made for mounting on a Jeep or Jeeps to recharge the referenced batteries directly from the battery-generator of the Jeep. The device would be sufficiently inexpensive to be standard equipment on all Jeeps located in the area and would be of such design to be used with other similar sources of power.

The beacon is housed in a waterproof, shock resistant small case (0.2 cu. ft.) with elementary control circuit ON-OFF, antenna insert plug and code insertion module (crystal). It is designed to be carried under jungle or other difficult conditions and to be deployed by technically untrained personnel. The unit will be carried into a position where subsequent airborne drops are desired. The unit is set on the ground or in a tree, a simple radio frequency ground spike is set, and an antenna connected after being deployed in the jungle trees. The unit will then be turned-on and left in position until retrieval after drop operations are completed.

The simple all solid state unit will automatically transmit a signal at about 300 kc. (1 watt output) for long distance (100 mi.) crude position location by means of an airborne DF direction finding set on the 300 kc. ground wave; and a signal at about 30 mc./s. (0.3 watt output) for close-in position location and accurate drop operations by low speed aircraft (100–200 knots up to 20 mile range). The aircraft would have to be provided with a special solid state homer for drop operations using the 30 mc./s. signal.

Both the 300 kc. signal and the 30 mc. signal are transmitted by very precise crystal controlled frequency sources. The 300 kc. transmitter holds frequency to ±0.03 cycle/second (readily obtainable) and the 30 mc. transmitter holds frequency to ±0.3 cycle/second (readily obtainable). With narrow band crystal filter receivers (for 300 kc. a 1 cycle/second bandwidth and for 30 mc. a 100 cycle/second bandwidth) in an aircraft, ranges of 100 miles and 15–20 miles, respectively, can be reliably obtained with the transmitted powers supra, and with a single wire antenna lying on the treetops with its attendant losses.

Individual drop beacons may be identified by the specific beacon LF and beacon HF frequencies. Fifty-five beacon codes may be available. These can be selected by day, week or as a function of an operation. Reasonable security under jungle conditions is thereby obtained.

FIG. 7 shows a block diagram of the drop beacon. The crystal oven 100 and transistor oscillators 102 and 104 are conventional designs. The power amplifiers 106 and 108 are also simple transistor circuits using proven ultra-reliable components.

An antenna auto-tuner 110 (coupled to power amplifier 106) uses two electrically variable solid state capacitors (Varactors) and one electrically variable inductance (Increductor) to match the LF antenna impedance, which can be anticipated to be a reactance ranging from several thousand ohms inductive to several thousands ohms capacitive with a relatively small real part. The antenna must be tuned to obtain useful amounts of radiated LF power. The HF antenna will be of more constant impedance and an auto-tuner will not be necessary. The multiplexer 112 is a simple LC circuit.

The unit includes a ground spike 114 and may be powered by a rechargeable battery 116 or nickel-cadmium battery 118.

The circuits proposed are known designs using readily available components.

The important elements in the design of the drop beacon are (a) minimum power consumption for long operating time with small reliable batteries; (b) simplicity and reliability; and (c) a mechanical package and design capable of withstanding high impacts, total immersion, high temperatures, and prying hands.

The case may be constructed of molded fiberglass. FIGS. 8a, 8b, 8c and 8d show the proposed beacon in its carrying case. The configuration is designed to match a man's backpack and also to be carried using the strap connection as handles. The case easily opens to insert crystal modules and to insert and remove batteries. The number of batteries carried can be decided upon just before a mission. Anywhere from one to four batteries can be carried depending upon the length of time the beacon must operate unattended, from 8 to 35 hours.

Figure 9:
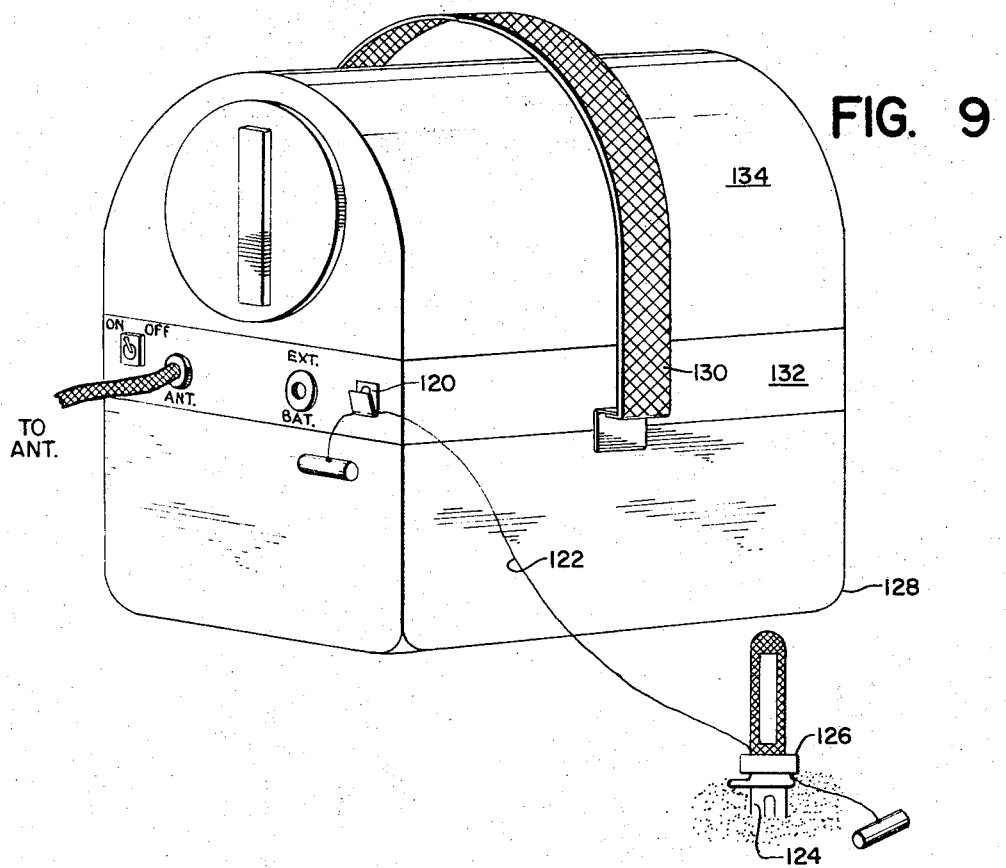

Another physical embodiment of the beacon configuration of FIGS. 8a to 8d is shown in FIG. 9. The principal differences include replacement of the originally proposed nickel-cadmium batteries by silver-zinc batteries, which reduces the operating time to 8 hours maximum (previously 35 hours); elimination of a meter to read battery charge and the self-contained ground spike; the electronic package has been completely modulized for greater operational flexibility; major reduction in case size and internal structure previously necessary to support the 4 heavier batteries.

The electrical characteristics previously discussed remain unchanged. The module oven and oscillator package previously described remain unchanged as well as the means and methods to obtain code variations.

The effect of the battery change is to greatly reduce the total battery weight and concomitant structure and case weight. The silver-zinc batteries store approximately five times as many watt hours per pound of battery as do the nickel-cadmium batteries. The battery proposed under this alternate weighs approximately 1½ lbs. and will provide eight hours of reliable operation.

The change to the silver-zinc battery causes certain disadvantages. The silver-zinc battery does not have an unlimited life; after about 5–7 recharges, its efficiency drops quite rapidly and the battery must be discarded. The nickel-cadmium battery has an almost unlimited life (and recharge cycles). The basic cost of the silver-zinc battery is considerably higher than the nickel-cadmium battery, such that cost per watt hour per pound is essentially the same for the two batteries.

Where cost and operating life are of prime importance, the embodiment of FIGS. 8a to 8d can best serve for counter-insurgency operations. Where weight and size are of prime importance, and the other factors of lesser importance, then the alternate proposal best fits the purpose.

As a further alternate to the light weight beacon, a separate battery pack may be so wired (and internally wired in the beacon) that when desired, it could be plugged into the light weight beacon (in parallel) to save the internal battery or even such that the internal battery would be disconnected and the power derived from the external pack. This package would use nickel-cadmium batteries for lesser cost and greater operating life—based upon the principle that if the extra battery pack can be carried, the additional weight of the nickel-cadmium batteries can be afforded.

Reduction of the operating time and change in battery type produces a major reduction in overall size and weight when considered with the corresponding case reductions in size and weight.

Further weight reductions may be made by the eliminating of the dial indicating battery charge (or discharge) and its corresponding circuitry. This is not absolutely essential providing the using personnel use the light weight beacon only when necessary and keep a crude record of operating time. A simple hard surface decal can be placed on the battery box for keeping such records.

Another weight reduction made in this alternate proposal can be accomplished by eliminating the self-contained ground spike. Instead of this, a jam cleat type of fitting 120 will be provided on the case, to which the standard equipment stainless steel wire garrot 122 can be attached. The other end of the wire would be clipped to a rifle bayonet 124 to serve as the ground spike. A special spring steel clamp 126 would be provided to attach the wire garrot to the bayonet. When not in use, the clamp would be carried by direct attachment to the cleat fitting on the case, preventing loss and protecting the personnel from the protruding edges of the cleat.

The basic design of the package is in three sections. The battery box 128 is directly detachable for recharging and/or replacement. The batteries cannot be recharged while attached to the unit (further weight saving). The battery case design would be so made that the outer structure of battery would form the lower part of the beacon. The beacon handles 130 would form the clamp to hold the battery box. An internal connector would make contact when the battery box was clamped to the beacon.

The upper two sections of the beacon contain the electronic circuitry and oven. The middle section 132 holds the LF and HF power amplifier circuits, the antenna autotuner, and the antenna multiplexer as well as all external connectors, battery connector, ON-OFF control and cleat, as shown in FIG. 9. The LF and HF amplifiers and autotuner are made as three separate modules (potted) and will be inserted into the middle section in the same manner as the battery box. They are throwaway modules rather than repairable because of the lack of maintenance provisions expected in the jungle and the opportunity to save weight by simpler construction. Since these circuits are simple in design and of all solid state components, the reliability factor will make replacement relatively infrequent and stock spares very low. The main reason for the module approach is to make design simpler when considering the standard beacon and the possibility of using the concept for a target marker. The design of the beacon becomes purely a matter of assembling the various modules.

The only other circuitry is internal wiring and the antenna multiplexer. The multiplexer is a part of the antenna receptacle and replaceable as a module.

Module replacement can only be made when the battery is removed. In this manner no dust covers, doors, etc., will be necessary. With the battery removed, the modules are exposed for easy plugging in or out or other simple maintenance (obviously any maintenance would automatically call for a new battery). When the battery is attached in place, the unit is sealed and watertight.

The top section 134 contains the crystal oscillators and oven module. This is simply screwed into place as shown in the figure. The module contains the basic oscillators and oven with internal insulation. The shown configuration is such that the outer insulation and protection against shock and vibration is part of the basic beacon package.

TABLE II

*Weight breakdown.—Light weight drop marker beacon*

|  | Lbs. |
|---|---|
| Batteries: Silver-zinc, 18 v., nominal 30 watt hour capacity based on Yardney data | 1.5 |
| Hardware: ON-OFF switch, antenna plug, jam cleat for ground connector, ext. battery connector, strap handles and battery case clamps, and bayonet clamp | 0.37 |
| Crystal oven: 7 oz. oven, 2 oz. circuits based on redesign of Bulova type AM–100–ED oven | 0.56 |
| LF amplifier module: Standard model design estimate (includes 2 oz. powdered iron core) | 0.25 |
| HF amplifier module: Standard design estimate | 0.12 |
| Antenna autotuner module: Standard design estimate (includes three (3) 2 oz. powdered iron cores) | 0.5 |
| Case: Molded epoxy fiberglass, 160 sq. in., average 1/16" thick, .067 lb. per cubic inch | .67 |
|  | 3.97 |

*Antenna system.*—The ground based antenna system radiates low power signals in the LF and HF frequency bands; low frequency signals in the 100–500 kc. range can be used and high frequency signals in the 20–80 mc. range can be used. Calculations of antenna efficiency and radiation reliability discussed below are based upon 300 kc. and 30 mc., respectively. The antenna system is designed for use in dense jungle with a 25' layer of dense vegetation covered by 150' trees with an intermediate growth projecting out of the undergrowth. This vegetation will frequently be saturated with rain, humid or dry at different intervals of the day and to different degrees as the seasons change. Occasional clearings will be available, but the antenna system is usable in dense, uncleared jungle as well as in clearings.

The basic antenna system consists of 400 feet of RG–178 B.U. coax wound inside a canister which is fired up through the trees with a modified rifle grenade from an Armalite AR–15 rifle. (See FIG. 3.) The first 100 feet of coax is intact; the remaining 300 feet is stripped of its outer covering and the braided outer conductor. In operation the HF signal will be transmitted up the coax and will radiate from the part of the antenna near the end of the outer conductor. The entire length of the antenna will radiate as a single wire antenna for the LF signal.

This antenna system provides an ultra-simple, easily man carried and operated system, and an antenna of tolerable efficiency for use in the jungle.

Neither the HF nor the LF signals will be radiated efficiently by this antenna system when measured against standards normally applied to these types of signals. In the design of any system using this antenna the antenna losses of 20 db and 30 db must be assumed for the LF and HF signals, respectively. It is important to note that antenna deployment must be efficient in time and ease of operation by untrained personnel. Selection of time, equipment or location is not designed or planned; the circumstance of the operation must not be hampered by special requirements. When a transmission is necessary the antenna must be available immediately. This type of compromised design concept has been applied and the antenna losses stated thereby result; these are tolerable with proper selection of transmitter equipment and receiver equipment. Technical approaches to equipment able to operate with this antenna system are available; no special techniques or state of the art components are required, just straightforward design.

Under night time atmospheric radio noise conditions in the 5°–20° latitudes, it is possible that the anticipated LF antenna losses may be greater than those which are tolerable. To increase range under night time conditions an alternate equipment kit may be supplied which will provide for a small helium filled balloon to elevate the end of the wire well above the tops of the jungle growth. This alternate scheme has disadvantages in that the balloon will be visible in daytime for some distance, especially to jungle acclimated indigenous personnel. The balloon could be shot down by friendly personnel at daybreak. The ballon would also require a man-made or natural clear opening overhead for the balloon to get through the trees.

As a further step beyond the hand launched balloon and/or the rifle-grenade, it may be possible to build a rifle grenade launcher in which the projectile itself contains the balloon which automatically deploys towards the end of the wire canister's trajectory.

Figure 10:
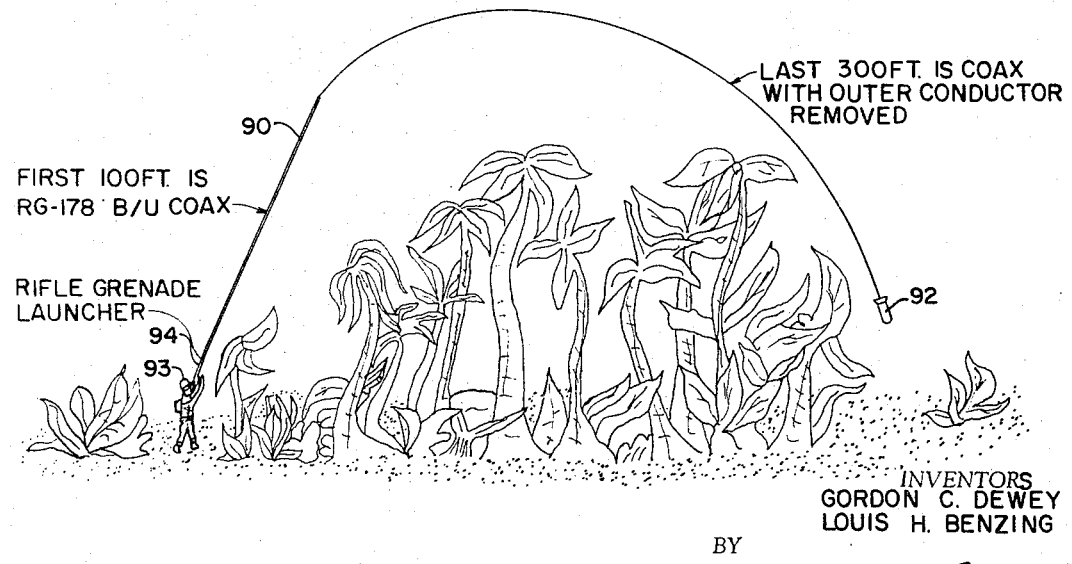
FIG. 10 is a diagrammatic illustration of an antenna launching system.

The invention accelerates the entire mass of wire at the time the rifle grenade is launched, with the wire uncoiling from within the projectile as it proceeds along the trajectory, thus avoiding the problem of dragging the wire through the trees and breaking it, and the advantage of higher mass during the trajectory period when penetration of jungle growth is a problem (see (FIG. 10).

The rifle launched wire canister is shown in FIG. 11, which is self-explanatory. The wire 90 is loaded into the canister 92 from the outside in. This is done by holding the canister on a high speed rotating mount with rapidly controlled feeding of the wire into the canister end. Centrifugal force throws the wire to the outside and the result is a dense uniform winding. Unloading of the wire proceeds from the inside out without requiring the canister to rotate. With this scheme acceleration stresses required to accelerate a rotating reel, as well as snarling of the wire by a bobbin or mandrel inside the wire coil, are avoided.

A spring loaded eject mechanism (not shown) is built into the modified rifle grenade. When the launcher acceleration has reduced, the spring will eject the lower cone and plug allowing them to fall away from the canister. The main purpose is to give the grenade a better aerodynamic shape and to cause the wire to flow out directly downward about the same time as the acceleration decreases and the drag begins to have an effect. This will allow greater range, less possible snarling in the trees, and smoother laying of wire without fear of the wire twisting around the canister cone. The freed cone and plug will slide down the wire and fall in undergrowth or trees; in fact, provide further wire guidance through the trees, particularly of the coax section.

Another key factor in the invention is the use of coax cable for the first 100 feet. This extra strength proves a distinct advantage during the major acceleration period when the most strain will be placed upon the wire/canister combination. At the 100 foot point in its travel the overall weight is less, acceleration less, and unwinding wire lighter, all contributing to more efficient trajectory, therefore, more antenna efficiency.

The rifle grenade launched wire canister requires a wire build-up which will withstand the acceleration at firing, and a body which is relatively stable against tumbling due to aerodynamic instability and/or minor collisions with vines, twigs, heavy leaves and/or small branches.

*Operation.*—Deployment of the antenna will be ultra-simple, as easy as firing a standard rifle grenade. The antenna grenades could be carried in the same manner as conventional armament; the cartridge used to fire conventional grenades would serve to fire the antenna grenade.

To lay the antenna the operator 93 would place the grenade into the muzzle of the rifle 94 in the same manner as for firing a standard grenade and insert his grenade cartridge. The rifle butt would then be firmly placed on the ground (or shoulder) with the muzzle pointed upward, as near vertical as possible, but also aimed at the most unobstructed route through the jungle that the personnel can find (if the grenade hits a large heavy tree it would not deploy properly and a new antenna would have to be fired). Once the rifle is set the antenna wire connector (protruding out of the grenade cone) would be pulled out the necessary length and placed under the foot of the soldier holding the rifle. Otherwise, the minimum possible slack to launch jerk would break the wire. When the trigger is pulled, the LF/HF antenna is properly deployed as shown in FIG. 10.

We claim:

1. Apparatus for indicating the approach of a vehicle to a transmitter, one of said vehicle and said transmitter moving at a determined altitude and velocity relative to the other of said vehicle and transmitter, said apparatus comprising transmitter means for radiating signals, Doppler means supported by said vehicle for producing signals indicative of the Doppler shift in signals radiated from said transmitter means and reaching said vehicle, and indicating means responsive to determined Doppler frequencies and said altitude and velocity for indicating different distances between said vehicle and said transmitter means.

2. Apparatus for use in a moving vehicle cooperating with a fixed beacon transmitter, one of said vehicle and said transmitter moving at a determined altitude and velocity relative to the other of said vehicle and transmitter, said apparatus comprising receiving means for receiving signals radiated by said beacon transmitter, Doppler means for producing signals indicative of the Doppler shift in the signals from said beacon transmitter received at said vehicle, and warning means responsive to predetermined Doppler frequencies and said altitude and velocity for indicating specific distances between said vehicle and said beacon transmitter including when said vehicle is substantially at said beacon transmitter.

3. Apparatus as claimed in claim 2, wherein said moving vehicle is an aircraft and said beacon transmitter is fixedly positioned on the ground.

4. Apparatus as claimed in claim 2, wherein said receiving means comprises a first and second antenna each having an output, amplifier means each having an output and an input coupled to the output of a corresponding one of said antennae, a hybrid circuit having an output and two inputs coupled to the outputs of said amplifiers, said hybrid circuit producing at its output a sum and a difference channel, a first crystal filter amplifier having an output and an input coupled to said difference channel, a second crystal filter amplifier having an output and an input coupled to said sum channel, a phase sensing detector having an output and an input coupled to the output of each of said first and second crystal filter amplifiers, and a first indicator coupled to the output of said phase sensing detector for providing an indication of the direction of the signal received by said first and second antennae.

5. Apparatus as claimed in claim 4, further comprising an automatic gain control detector coupled to the corresponding input of said phase sensing detector, said automatic gain control detector producing a biasing signal, coupling means for applying said biasing signal to said first and second crystal filter amplifiers to control the gain therein, second indicator means for indicating the magnitude of the signal received by said first and second antennae, and further coupling means for applying said biasing signal to said second indicating means.

6. Apparatus as claimed in claim 5, further comprising a reference frequency source for providing a fixed reference frequency and Doppler frequency means coupled to said phase sensing detector and to said reference frequency source for producing an indication having a magnitude proportional to the difference in frequency between the output of said second crystal frequency amplifier and said fixed reference frequency.

7. Apparatus as claimed in claim 6, wherein said Doppler frequency means comprises an input amplifier having an output and an input coupled to said phase sensing detector, a mixer having an output, a first input coupled to the output of said input amplifier and a second input, oscillator means having an output for producing a selected predetermined frequency signal, coupling means coupling the output of said oscillator means to the second input of said mixer, an output amplifier having an output and an input coupled to the output of said mixer and tuned to the difference between the frequency of the selected signal of said oscillator means and the frequency of said second crystal amplifier, frequency counter means having an output and an input coupled to the output of said output amplifier for computing the magnitude of said frequency difference and producing a signal proportional to said magnitude, and indicator means coupled to the output of said frequency counter means for visually indicating the magnitude of said frequency difference.

8. Apparatus as claimed in claim 7, wherein the input amplifier of said Doppler means comprises an isolation amplifier for producing at its output a signal substantially isolated from the signal applied to its input.

9. Apparatus as claimed in claim 7, wherein said oscillator means comprises a crystal oscillator for producing a stable frequency substantially equal to the frequency radiated by said beacon transmitter to said first and second antennae.

10. Apparatus as claimed in claim 9, wherein said oscillator means further comprises an oven surrounding said crystal oscillator for maintaining said oscillator at a predetermined fixed and stable temperature.

11. Apparatus as claimed in claim 7, wherein said Doppler frequency means further comprises a radio frequency shield surrounding said Doppler frequency means for isolating said Doppler frequency means from external signals.

12. Apparatus for use in an aircraft cooperating with a ground based beacon transmitter, said aircraft moving at a determined altitude and velocity relative to said transmitter, said apparatus comprising first and second antenna means each having an output, a hybrid circuit having an output and two inputs each coupled to the output of a corresponding one of said antenna means and producing at each of its outputs the sum and difference of signals received by said antenna means, indicator means coupled to the output of said hybrid circuit for producing an indication proportional to the magnitude of the difference of said signals at the output of said hybrid circuit, a reference frequency source for providing a fixed reference frequency determined by the altitude and velocity of said aircraft, Doppler means coupled to the output of said hybrid circuit for producing signals indicative of the Doppler shift in signals from said beacon transmitter received at said aircraft with respect to said reference frequency, and warning indication means responsive to predetermined Doppler frequencies for indicating specific distances between said beacon transmitter and said aircraft including when said aircraft is substantially directly above said beacon transmitter.

13. A dual frequency counter-insurgency system wherein an aircraft is to drop objects on a fixed beacon transmitter on the ground, said aircraft moving at a determined altitude and velocity relative to said transmitter, said apparatus comprising a low frequency long range direction finding system on said aircraft, a high frequency short range direction finding system on said aircraft for cross track precision tracking, high frequency Doppler means coupled to said direction finding systems for indicating in accordance with the altitude and velocity of said aircraft the relative position of said aircraft with respect to said beacon transmitter and the time at which said objects are to be dropped, and means included in said beacon transmitter for precisely stabilizing the frequency of said beacon transmitter to maximize the attainable range thereof.

14. A system as claimed in claim 13, further comprising signal antenna means adapted to be connected to said beacon transmitter, and means for rapidly positioning said signal antenna means above foliage on the ground for relatively free transmission.

15. A system as claimed in claim 14, wherein said signal antenna means comprises a rifle grenade having a hollow body, a spool in the hollow body of said rifle grenade and a wire conductor wound around said spool and having one end coupled to said transmitter.

16. A system as claimed in claim 15, wherein said grenade further comprises drag stabilizer means affixed to said grenade for stabilizing the trajectory of said grenade when it is launched.

17. A system as claimed in claim 16, wherein said wire conductor is wound around said spool in a manner in which said wire conductor pays out freely from said spool when said grenade is launched.

18. A system as claimed in claim 17, wherein said wire conductor includes a coaxial cable integrally forming a portion thereof.

References Cited

UNITED STATES PATENTS 3,172,108   3/1965   McClure _____ 343—100 X

FOREIGN PATENTS 1,260,471   3/1961   France.

RODNEY D. BENNETT, *Primary Examiner.*

R. E. BERGER, *Assistant Examiner.*